April 19, 1960 F. E. TUTTHILL 2,933,570
PRESSURE SENSITIVE PUMP CONTROL
Filed Jan. 6, 1958 2 Sheets-Sheet 1
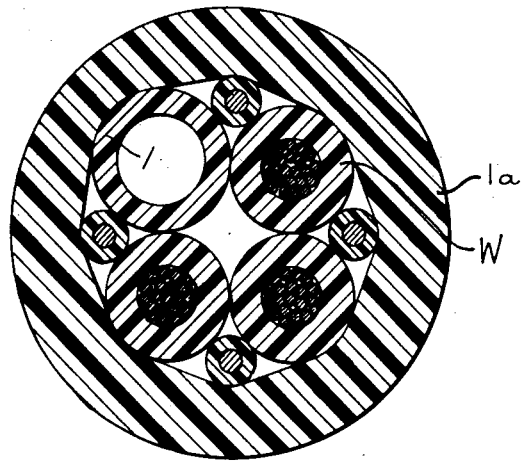
Fig. 3
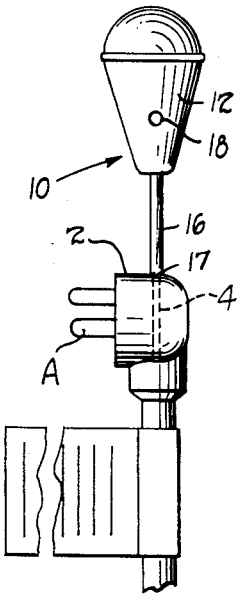
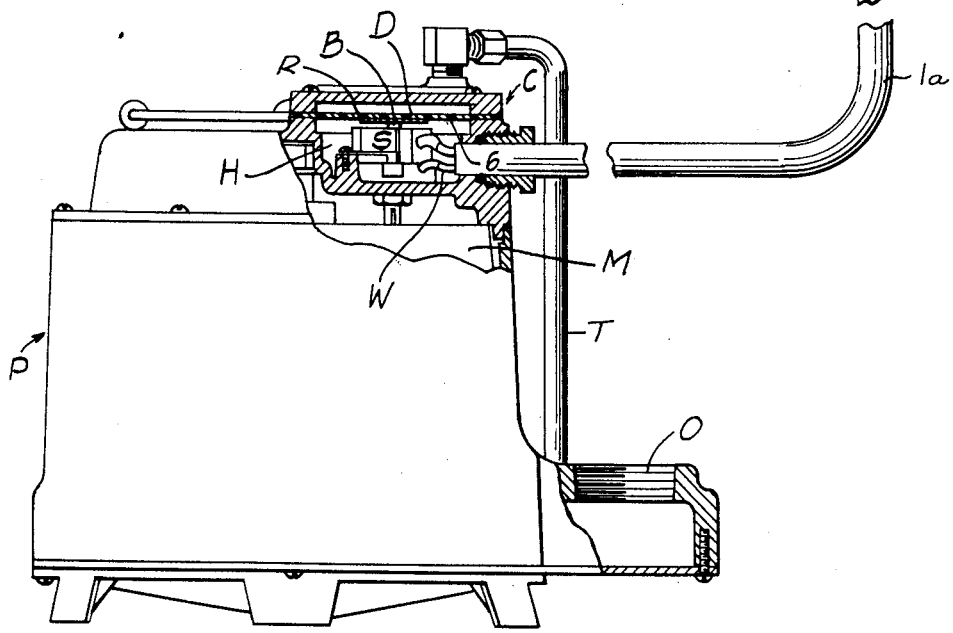
Fig. 1
INVENTOR.
FRED E. TUTTHILL
BY Bosworth, Sessions,
Hardran & Knowles
ATTORNEYS

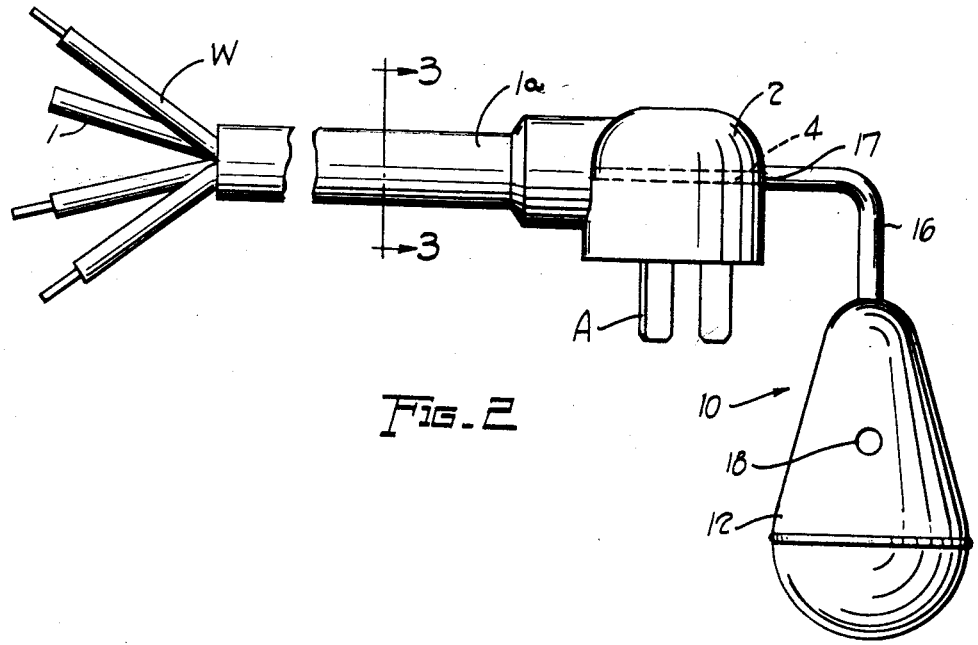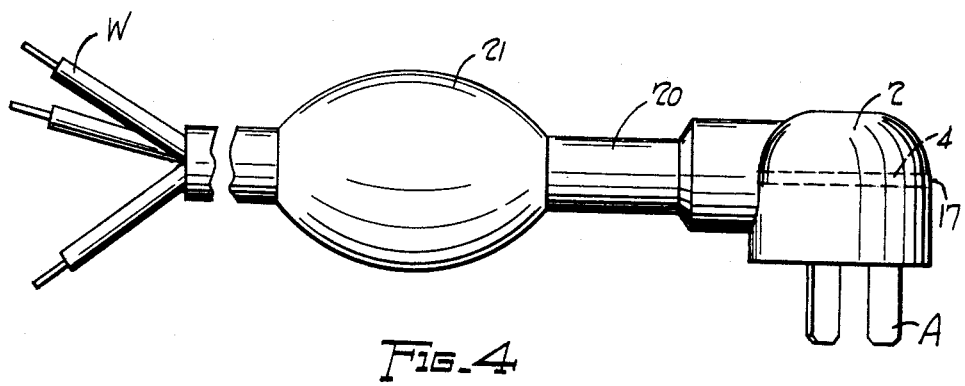

United States Patent Office 2,933,570
    Patented Apr. 19, 1960

2,933,570
    PRESSURE SENSITIVE PUMP CONTROL

Fred E. Tutthill, Grafton, Ohio, assignor to Kenco Pump Division of The American Crucible Products Company, Lorain, Ohio, a corporation of Ohio Application January 6, 1958, Serial No. 707,408

6 Claims. (Cl. 200—83)

This invention relates to pressure responsive pump controls and more particularly to means for selectively actuating pressure responsive pump controls.

In recent years it has become increasingly common to provide electrical motor driven sump, bilge and other pumps with automatic controls which are adapted to respond to predetermined pressures, such as are exerted by a predetermined liquid level, to actuate the pump and to other predetermined pressure conditions to deactuate the pump. Such controls are either incorporated within the pump housing, secured to the exterior of the pump housing or have a separate housing and are interconnected with the pump by suitable conduits and/or electrical leads, and usually include at least one pressure sensitive diaphragm, which is exposed to the source of actuating pressure, a switch, disposed in a switch chamber in operative relation with the diaphragm and adapted to be actuated by the diaphragm, when the same is displaced by the actuating pressure.

Experience has shown the desirability, under certain conditions of use, of providing such controls with apparatus whereby the pump, associated therewith, may be selectively actuated before the necessary conditions exist to exert the predetermined actuation pressure and/or may be maintained in operation after the conditions otherwise necessary to permit deactuation of the pump have obtained.

It is therefore a general object of my invention to provide improved apparatus for selectively actuating a pressure sensitive pump control. Another object of my invention is the provision of apparatus, for selectively actuating a pressure sensitive pump control, which is economical to manufacture, simple to use and positive and foolproof in operation and has a maximum life and service.

Other objects of my invention include the provision of apparatus, for selectively actuating a pressure sensitive pump control, which does not interfere with the normal automatic operation of the control itself; which provides for the acutation and the maintenance of actuation of the control and the pump controlled thereby within the usual areas of non-operation; which obviates danger to the operator because of electrical hazard attendant selective actuation of the control; which may be used with both single and multiple stage controls; which can be superseded by the automatic operation of the control after actuation is selectively initiated; which is particularly adapted for use with controls having breather tubes and is adapted to function as a part and/or addition to the breather tube system; and which requires no additional components internally of the control.

Still further objects of my invention are the provision of apparatus for selectively actuating a pressure sensitive control, which does not complicate the electrical system of the pump and control and is not restricted by the size and horsepower of the pump motor and/or which accomplishes one or more of the objects set forth above.

These and other objects and advantages of my invention will become apparent from the following description of preferred and modified embodiments thereof, reference being had to the accompanying drawings in which:

Figure 1 is an elevation of apparatus embodying a preferred form of my invention together with a control and pump, partly in section and partly in elevation, with which it is associated;

Figure 2 is an elevation, on a larger scale than Figure 1, with the control and pump removed, of apparatus embodying a preferred form of my invention;

Figure 3 is a section viewed along the line 3—3 of Figure 2; and

Figure 4 is an elevation of apparatus embodying a modified form of my invention.

My invention comprises means for selectively, manually actuating a pressure sensitive control, adapted to initiate, maintain and terminate, under predetermined conditions, the operation of an electrical motor driven pump, and having a pressure sensitive actuating diaphragm in communication with the liquid to be pumped and adapted to be displaced by the hydrostatic pressure of the liquid so as to engage and depress a switch operating button and close an electrical circuit to initiate the operation of the pump motor. Apparatus embodying my invention is operable at the discretion of the operator to displace the control diaphragm in the direction necessary to engage the switch operating button even though the hydrostatic pressure imposed upon the diaphragm by the then existing liquid level is not sufficient, per se, to so displace the diaphragm.

More particularly my invention comprises means to induce a sufficient pressure on the actuating diaphragm so as to cause the diaphragm to be displaced in the same direction as the hydrostatic pressure displaces the diaphragm with a force which is greater than the operating force of the switch. Preferably the induced pressure is a negative pressure applied to the opposite side of the diaphragm from that upon which the hydrostatic pressure acts. Once operation of the pump has been initiated, it is maintained, as when the switch is actuated by hydrostatic pressure until the predetermined conditions necessary for the opening of the switch and deactuation of the motor obtain or until the induced pressure is released in those instances where the operator desires to maintain the operation of the pump beyond the time when the predetermined deactuation conditions arise.

For convenience I will describe my invention in the environmental surrounding a sump pump having a single stage pressure sensitive diaphragm control which is disposed within the pump housing. It is to be understood, however, that my invention may be used with double stage and other types of pressure sensitive controls, with pressure sensitive controls associated with other types of pumps and with pressure sensitive controls which are secured to the pump housing or in a separate housing of their own which is connected to the pump by suitable conduits.

As shown in Figure 1, the pump and control with which my invention is associated are indicated generally at P and C respectively. The pump has an electrical motor M for driving a centrifugal impeller which is separated from the motor by a water-tight wall and is generally disposed in the lower portion of the pump. The liquid to be pumped is drawn in through a central aperture in the underside of the pump housing and is discharged through the discharge opening O to a suitable discharge pipe (not shown). The control C includes a switch S having operating button B and mounted within a switch chamber H. A diaphragm D having reinforcing disc R closes one side of the switch chamber H and is disposed in operable relation with the switch operating button B, and the hydrostatic pressure of the liquid within the pump and the discharge pressure of the pump is communicated to the side of said diaphragm remote from said button B by a suitable conduit T.

With such controls air is entrapped within the switch chamber H and changes in the altitude at which the pump is disposed cause, in effect, an increase or decrease of the pressure existing within the switch chamber and acting upon the switch button side of the diaphragm D. This affects the operation of the control by causing the pump to respond to a different liquid level or hydrostatic pressure than it otherwise would.

In order to prevent such air lock and provide a pump and control which may be used at any altitude or under any atmospheric conditions without requiring adjustment of the control, it is common to provide a breather tube or air conduit 1 leading from the switch chamber H and adapted to extend, while in use, without the sump, bilge or other confined space within which the pump is disposed so that the air pressure within the switch chamber is the same as the atmospheric pressure on the liquid to be pumped without regard to the altitude at which the pump is used.

Suitable electric leads W connect the switch with the motor and with a power source and conveniently lead from the switch chamber to the power source through cord 1a through which breather tube 1 also conveniently extends. In such instances it is common to provide an electric plug 2 at the free end of the breather tube and to provide a narrow passage 4 in the plug 2. The passage 4 provides communication between the interior of the breather tube and the atmosphere. The electrical leads W are, of course, connected to the prongs A of the plug and the entire assembly provides a convenient means of providing power for the operation of the motor and communication between the atmosphere and the switch chamber.

In use, such control and pumps are set to respond to a predetermined level of liquid in order to actuate the pump and to other predetermined conditions in order to maintain the pump in operation and to deactuate the same. All of the above is old in the art and per se forms no part of my invention.

In order to selectively actuate the pump and/or to selectively maintain the operation thereof beyond the time when the control would otherwise deactuate the pump I provide means for selectively inducing a pressure on the diaphragm D, which causes or tends to cause the same to be displaced in a direction necessary to operate the switch and which is independent of the pressure exerted by the liquid to be pumped or being pumped. More particularly in the preferred form of my invention I provide means by which the pressure existing within the switch chamber H and acting on the switch button side 6 of diaphragm D may be selectively reduced by the operator in order to cause the diaphragm D to displace toward and against the switch button (downwardly as viewed) with a force sufficient to operate the switch button in the same manner that a positive hydrostatic or discharge pressure acting on the side of the diaphragm D remote from the switch button cause the diaphragm to respond.

Therefore broadly my invention comprises a resilient collapsible chamber disposed as a part of the breather tube system. The resilient collapsible chamber has a relatively large volume compared to the volume of the breather tube and the switch chamber and has communication with the atmosphere to the end that the operator or user may selectively collapse the chamber, while the same is in communication with the atmosphere, in order to displace the air therefrom and then release the chamber, while closing the communication with the atmosphere, so that as the resilient chamber regains its normal shape, it reduces the air pressure existing within the breather tube 1 and chamber C and acting upon side 6 of diaphragm D to a negative pressure such that diaphragm D exerts a force on button B which is greater than the switch operating force.

More particularly apparatus embodying the preferred form of my invention is indicated generally at 10 in Figures 1 and 2 and comprises a flexible resilient hollow bulb 12. Bulb 12 is preferably of such shape that it is readily grasped and squeezed by the operator or user and has its interior in communication with the interior of breather tube 1. To this end I conveniently provide tube 16 for connecting bulb 12 with the end 17 of passage 4, albeit bulb 12 may be directly connected to the breather tube or passage 4 if desired. In order that bulb 12 have selective communication with the atmosphere I provide a port or aperture 18 therein. Port 18 has communication with the interior of the bulb and is adapted to be controlled so that the flow of air from the bulb to the atmosphere and from the atmosphere to the bulb is at the discretion of the operator. To this end I preferably make the aperture 18 of such size that it may be conveniently opened or closed by the user placing his thumb over the same or removing it therefrom, albeit suitable valve means for controlling the opening of aperture 18 may be provided if desired.

In use the pump and control are disposed in a sump for example with the breather tube extending therefrom and the selective actuation apparatus outside the sump and the plug connected. When the pump is at rest the operator may initiate actuation of the pump, prior to the automatic initiation thereof in response to a predetermined liquid level, by squeezing or collapsing bulb 12 and then placing his thumb or finger over the aperture 18 and permitting the bulb to expand to its normal shape. This, as noted above, actuates the pump. The operator may then remove his thumb from the aperture 18 under which conditions the pump deactuates in response to the predetermined conditions which normally deactuate the pump or the operator may maintain his thumb or finger over the aperture 18 and thereby maintain the operation of the pump even after the conditions which normally deactuate the pump have been obtained.

Also if desired once the operation of the pump has been automatically initiated, the operator may maintain its operation after the normal conditions for deactuating the pump have arisen by operating the apparatus 10 in the above described manner, prior to the time at which the predetermined deactuating conditions arise, and maintaining his thumb over the aperture 18 after they have arisen.

A modified form of apparatus embodying my invention together with the breather tube with which it is associated is shown in Figure 4, it being understood that the tube and selective actuator shown in Figure 4 is associated with an appropriate pressure sensitive control such as, for example, that shown in Figures 1 and 2. In this instance the wires W extend through the breather tube 20 which is formed with an enlarged bulbous portion 21. Bulb 21 has resilient collapsible walls and is adapted to be squeezed and collapsed in order to evacuate air therefrom and to return to or regain its normal position and shape when released. In this instance communication between the interior of the bulb and the atmosphere is preferably via the breather tube and passage 4 and the flow of air into and out of the bulb 21 and tube 20 is controlled by selectively opening and closing the end 17 of passage 4 as by the use of a finger or thumb. Alternatively the communication between the interior of the bulb 21 and the atmosphere may be obtained by a port situated in the bulb or in the breather tube adjacent the bulb or intermediate the bulb and plug.

The operation of the modified form of my invention is substantially similar to that of the preferred form of my invention except that the operator may find it more convenient to squeeze the bulb 21 with one hand and control the aperture providing communication with the atmosphere with the thumb or fingers of the other hand.

In both modifications of my invention the interior size or volume of the bulb is related to and determined by the air space within the breather tube and switch chamber and must be sufficient to ensure that the collapsing of the bulb displaces sufficient air to ensure that the force exerted upon the diaphragm, when the bulb regains its original shape and reduces the pressure within the switch chamber and breather tube, is sufficient to actuate the switch.

While I have described both the preferred and modified forms of my invention in connection with a breather tube which also functions as a conduit for electric leads it is apparent that the electrical leads are not necessary to the functioning of apparatus embodying my invention and may therefore be disposed in a separate conduit if desired.

Modifications, changes and improvements to the preferred and modified forms of my invention herein described may occur to those skilled in the art who come to understand the principles and precepts thereof. Accordingly I do not wish to be limited in the scope of my patent to the embodiments of my invention herein particularly illustrated and described, but only by the advance by which my invention has promoted the art.

I claim:

1. A pressure responsive control for submersible pumps and the like comprising a switch chamber, a switch disposed in said chamber and having an operating button for actuating the pump, a diaphragm forming a portion of the wall of said chamber and being in operable relation with said switch button and adapted to be displaced by a predetermined hydrostatic pressure to engage said button and actuate said switch and pump, a breather tube providing communication between said switch chamber and the atmosphere and having an end open to the atmosphere, and means for selectively reducing the pressure in said switch chamber to displace said diaphragm to actuate said switch and pump independently of said hydrostatic pressure, said means comprising a hollow bulb and a tube connecting the interior of said bulb with said open end of said breather tube, said bulb being resilient and collapsible and having a port providing communication between the interior of said bulb and the atmosphere whereby said bulb may be squeezed and collapsed with said port open to evacuate air therefrom and released from said collapsed position with said port closed to reduce the pressure within said bulb, breather tube and switch chamber.

2. A pressure responsive control for submersible pumps and the like comprising a switch chamber, a switch disposed in said chamber and having an operating button for actuating the pump, a diaphragm forming a portion of the wall of said chamber and being in operable relation with said switch button and adapted to be displaced by a predetermined hydrostatic pressure to engage said switch button and actuate said switch and pump, a breather tube providing communication between said switch chamber and the atmosphere and having an end open to the atmosphere, and means for selectively reducing the pressure in said chamber to displace said diaphragm to actuate said switch and pump independently of said hydrostatic pressure, said means comprising a resilient, collapsible hollow bulb having its interior in communication with said end of said breather tube and means providing communication between the interior of said bulb and the atmosphere whereby said bulb may be squeezed and collapsed with said second named means open to evacuate air therefrom and released from said collapsed position with said second named means closed to reduce the pressure within said bulb, breather tube and switch chamber.

3. A pressure responsive control for submersible pumps and the like comprising a switch chamber, a switch disposed in said chamber and having an operating button for actuating the pump, a diaphragm forming a portion of the wall of said chamber and being in operable relation with said switch button and adapted to be displaced by a predetermined hydrostatic pressure to engage said button and actuate said switch and pump, a breather tube providing communication between said switch chamber and the atmosphere and having an end open to the atmosphere, and means for selectively reducing the pressure in said chamber to displace said diaphragm to actuate said switch and pump independently of said hydrostatic pressure, said means comprising resilient collapsible hollow bulb means having its interior in communication with said breather tube and in controllable communication with the atmosphere whereby said bulb means may be squeezed and collapsed while in communication with the atmosphere to evacuate air therefrom and released from said collapsed position while communication with the atmosphere is prevented to reduce the pressure within said bulb means breather tube and switch chambers and displace said diaphragm.

4. The apparatus according to claim 3 in which said breather tube has an open end in communication with the atmosphere and said bulb means is disposed in said breather tube intermediate said end and said switch chamber and is in controllable communication with the atmosphere through said breather tube and open end.

5. A pressure responsive control for submersible pumps and the like comprising a switch chamber, a switch disposed in said chamber and having an operating button for controlling the operation of the pump, diaphragm means defining a portion of the wall of said chamber and disposed in operable relation with said switch button and adapted to be displaced by a predetermined fluid pressure to engage said switch button, and means for selectively reducing the pressure in said chamber to displace said diaphragm means to engage said switch button, said last named means comprising tube means in communication with said chamber and resilient collapsible hollow bulb means having an interior in communication with said tube means and in controllable communication with the atmosphere whereby said bulb means may be collapsed while in communication with the atmosphere to evacuate air therefrom and released from said collapsed position while communication with the atmosphere is prevented to reduce the pressure in said chamber, tube means and bulb means to displace said diaphragm means to engage said switch button.

6. A pressure responsive control for controlling a pump adapted to pump liquid and the like, said control including diaphragm means having one side adapted to be in communication with the liquid to be pumped and a second side remote from said one side, said diaphragm means being displaceable by a predetermined static pressure of said liquid acting on said one side of said diaphragm means to actuate said pump, said control also including resilient collapsible bulb means having a hollow interior in controllable communication with the atmosphere and tube means providing communication between said second side of said diaphragm and said interior of said bulb means, said bulb means selectively reducing the pressure on said second side of said diaphragm means and displacing said diaphragm means to actuate said pump independently of the static pressure of said liquid when said bulb means is collapsed while in communication with the atmosphere and released from said collapsed position while communication with the atmosphere is prevented.

References Cited in the file of this patent

UNITED STATES PATENTS

| | | |
|---|---|---|
| 247,142 | Woods | Sept. 13, 1881 |
| 1,184,371 | Myers | May 23, 1916 |
| 1,799,126 | Schirmer | Mar. 31, 1931 |
| 2,495,443 | Castellano | Jan. 24, 1950 |
| 2,635,546 | Enyeart et al. | Apr. 21, 1953 |
| 2,687,693 | Hudson | Aug. 31, 1954 |
| 2,765,743 | Hollinshead | Oct. 9, 1956 |
| 2,767,277 | Wirth | Oct. 16, 1956 |
| 2,804,516 | Staak | Aug. 27, 1957 |
| 2,834,845 | Nielsen | May 13, 1958 |